United States Patent [19]

Cordonna, Jr. et al.

[11] Patent Number: 5,061,464
[45] Date of Patent: Oct. 29, 1991

[54] OXIDATION PROCESS AND CATALYST FOR USE THEREFOR

[75] Inventors: George W. Cordonna, Jr., Lansdale; Eckhard R. Becker, Wayne, both of Pa.

[73] Assignee: Johnson Matthey, Inc., Valley Forge, Pa.

[21] Appl. No.: 539,319

[22] Filed: Jun. 14, 1990

Related U.S. Application Data

[63] Continuation of Ser. No. 270,011, Nov. 14, 1988, abandoned.

[51] Int. Cl.$^5$ .............................................. B01D 53/36
[52] U.S. Cl. ................................. 423/213.5; 423/245.3; 423/246; 423/247; 502/262; 502/339; 502/349; 502/350; 502/527
[58] Field of Search ................. 423/213.5, 247, 245.1, 423/245.3, 246; 502/325, 262, 339, 350, 527

[56] References Cited

U.S. PATENT DOCUMENTS

| | | | |
|---|---|---|---|
| 4,157,316 | 6/1979 | Thompson et al. | 502/304 |
| 4,171,289 | 10/1979 | Wheelock | 423/213.5 |
| 4,172,047 | 10/1979 | Gandhi et al. | 423/213.5 |
| 4,197,217 | 4/1980 | Gartshore et al. | 502/314 |
| 4,212,854 | 7/1980 | Maki et al. | 423/213.5 |
| 4,292,288 | 9/1981 | Gladrow | 502/42 |
| 4,440,874 | 4/1984 | Thompson | 423/213.5 |
| 4,642,302 | 2/1987 | Wood et al. | 502/262 |
| 4,702,897 | 10/1987 | Onal | 423/213.5 |
| 4,719,196 | 1/1988 | Vogt et al. | 423/213.5 |
| 4,720,376 | 1/1988 | Laue et al. | 423/213.2 |
| 4,727,052 | 2/1988 | Wan et al. | 502/328 |
| 4,738,947 | 4/1988 | Wan et al. | 423/213.5 |
| 4,753,915 | 6/1988 | Vogt et al. | 502/384 |
| 4,759,918 | 7/1988 | Homeier et al. | 423/215.5 |

*Primary Examiner*—Anthony McFarlane
*Attorney, Agent, or Firm*—Cushman, Darby & Cushman

[57] ABSTRACT

Improved sulfur tolerant platinum group metal catalysts exhibiting superior performance for the oxidative removal of CO and hydrocarbons from waste gas streams at low temperatures. The catalyst comprises at least one platinum group metal and at least one of silica, titania, zirconia, zeolite, and alpha-alumina.

6 Claims, No Drawings

OXIDATION PROCESS AND CATALYST FOR USE THEREFOR

This is a continuation of application Ser. No. 07/270,011, filed on Nov. 14, 1988, now abandoned.

This invention relates to an improved process and catalyst for the oxidative removal of CO and hydrocarbons from waste gas streams which can also contain sulfur compounds. In accordance with one aspect, this invention relates to supported platinum group metal catalysts that exhibit superior performance for the oxidative removal of CO and hydrocarbons from waste gas streams by conversion of CO and hydrocarbons to innocuous materials such as flue gases from engines combusting fossil fuels. In a further aspect, this invention relates to a low temperature oxidative process for the removal of CO and hydrocarbons from waste gas streams by contacting with a catalyst comprising a platinum group metal and at least one sulfur tolerant carrier.

BACKGROUND OF THE INVENTION

A number of catalysts have been developed and/or used in an effort to oxidatively remove CO and hydrocarbons from waste gas streams, especially sulfur-containing waste gas streams. Many of the known catalyst systems have met with failure and/or poor performance when placed in commercial operations.

As an example of the above problem, a known oxidation catalyst consisting of platinum-group metals on a high surface area alumina carrier deactivates rapidly in sulfur-containing flue gases at temperatures below about 460° C. The deactivation is due to alumina sulfate formation and subsequent loss of catalyst carrier surface area. Therefore, oxidation catalysts containing high surface area alumina cannot be used commercially for the treatment of sulfur-containing flue gases below about 460° C. Ideal catalysts should be stable and durable in the presence of $SO_x$ in the flue gas.

The present invention avoids the problems of the prior art by providing improved oxidation catalyst compositions having good activity and durability for the treatment of sulfur-containing flue gas streams. The present invention provides catalyst compositions comprising carriers which interact favorably with platinum-group metals and which are resistant to reaction with oxides of sulfur and exhibit superior performance for low temperature oxidative removal of CO and hydrocarbons from waste gas streams.

OBJECTS OF THE INVENTION

Accordingly, an object of the invention is to provide improved platinum-group metal catalysts.

Another object of this invention is to provide a commercially effective process and catalyst for the oxidative removal of CO and hydrocarbons from sulfur-containing waste gas streams.

A further object of the invention is to provide platinum-group metal catalysts having good activity, durability, and long catalyst life in the treatment of sulfur-containing waste gas streams.

A still further object is to provide a catalyst and process effective for the oxidative removal of CO and hydrocarbons from waste gas streams at low temperatures.

Other objects, aspects, as well as the several advantages of the invention will be apparent to those skilled in this art upon reading the specification and appended claims.

SUMMARY OF THE INVENTION

According to the invention, a catalyst and process are provided for the oxidative removal of CO and hydrocarbons from waste gas streams by contacting same at relatively low temperatures with a catalytically effective amount of an oxidation catalyst comprising catalyst carriers which interact favorably with platinum group metals and are resistant to reaction with oxides of sulfur that can be present in such streams.

In accordance with one embodiment of the invention, a process is provided for the oxidative removal of CO and hydrocarbons from either $SO_x$-containing or $SO_x$-free waste streams which comprises contacting said waste gas stream in an oxidizing atmosphere under oxidizing conditions at a temperature below about 500° C. in the presence of a metal catalyst the active component being at least one platinum group metal supported on a sulfur-resistant carrier.

In accordance with another embodiment of the invention, an effective oxidation catalyst is provided comprising at least one platinum group metal supported on at least one of silica, zirconia, titania, zeolite, and alpha alumina or combinations thereof.

The present catalysts maintain their oxidation activity in the presence of sulfur-containing flue gases and, therefore, these catalysts can be effectively utilized commercially for oxidation of gas streams that are either $SO_x$-containing or $SO_x$-free.

DETAILED DESCRIPTION

As disclosed above, the invention comprises a platinum group metal catalyst supported on carriers that are resistant to reaction with oxides of sulfur and to a process for the oxidation of CO and hydrocarbons in gas streams which can contain sulfur compounds in the presence of the invention platinum group metal catalyst.

The catalyst of the invention comprises at least one platinum group metal and at least one of silica, zirconia, titania, zeolite, and low surface area alpha-phase alumina in any combination.

Representative examples of platinum group metals that can be used include platinum, palladium, rhodium, ruthenium, osmium and iridium and mixtures thereof. Presently preferred are one or more of platinum, palladium and rhodium.

The amount of platinum group metal present in the catalyst composition is an oxidative catalytically effective amount. Generally, the total amount of platinum metal present ranges from about 0.005 to about 2 weight percent of the catalyst composition. A mixture of platinum group metals can be used in any ratio of one platinum group metal to another.

It is often desirable for economic reasons due to the cost of one of the platinum group metals to use two or more metals. As demonstrated by the specific working examples, mixtures of the platinum groups metals are effective oxidation catalysts. It should be noted further from the specific working examples that the instant catalysts exhibit improved catalyst performance in terms of stability over prior-art catalyst formulations.

The carriers that can be used that interact favorably with platinum group metals and which are resistant to reaction with oxides of sulfur include one or more of silica, zirconia, titania, zeolite, and low surface area alpha-phase alumina. Other than the alumina, the other carriers are high surface are materials. The surface area of these carriers generally is in the range of about 20 $m^2/g$ to about 1000 $m^2/g$ as measured by Brunauer, Emmett and Teller surface measurement technique.

In one embodiment of the invention a ceramic or metallic monolith is used as a support material. The metal monolith consists of alternate layers of flat and corrugated foil strips stacked to form a honeycomb structure. The foil is typically 0.002 inches thick and can be any of several ferritic stainless steels or other alloys. Cell densities of 100, 200, and 400 cell/sq. in. are obtained by varying the spacing and depth of the corrugations.

The carrier materials are well known in the art and can be prepared by methods known in the art.

One method that can be used for the preparation of the carriers is to mix the desired oxide with water to form the inorganic oxide material. The morphological and rheological properties of the oxide-water mixture can be adjusted by adding organic or inorganic acids or base. The oxide-water mixture can be applied to metal or ceramic monoliths, dried and then fired at 250° to 650° C. The firing step is optional. A catalytically active material from the precious metal groups is deposited by impregnation, for example, on the carrier material. The catalyst composition after deposition of the platinum metal on the carrier can be calcined at a temperature of about 300°–500° C. This calculation is also optional.

The catalysts of the invention can be formed into any shape desired and used in fixed bed, moving bed, fluidized bed or other known types of contacting with the stream to be oxidatively treated.

The invention comprises the oxidative removal of CO and hydrocarbons from either $SO_x$-containing or $S_x$-free gas streams in an oxidizing atmosphere under effective oxidation conditions of temperature, pressure, contact time and space velocity in the presence of the platinum group metal catalyst defined above.

The invention is applicable to the treatment of any gas stream containing CO and hydrocarbons, especially lower hydrocarbons, such as ethane, propane, and the like. These streams include waste gases exhausted from engines combusting fossil fuels which may or may not contain sulfur compounds.

In actual operation of an oxidation system, the catalyst is installed at a place in the gas flow path at which the temperature is below about 500° C., usually about 150° to about 500° C. The gas hourly space velocity (GHSV) of the gas stream in contact with the catalyst ranges from about 10,000 to 200,000 $hr^{-1}$. The gas streams treated generally contain sufficient oxygen to provide a suitable oxidizing atmosphere for removal of CO and hydrocarbons. However, if sufficient oxygen is not present in the gas stream being treated additional amounts can be added to the process at any point desired.

As demonstrated by the specific working examples that follow, CO conversions greater than 90% and propane conversion greater than 50% are achieved at oxidizing temperatures below 500° C. in the presence of flue gases containing sulfur compounds by contacting with the invention platinum group metal catalysts.

SPECIFIC EXAMPLES

The following examples are representative of the invention. A control catalyst representative of present commercial operation was prepared and compared with the invention catalysts.

EXAMPLE 1

A slurry containing gamma alumina (surface area about 120 $m^2/g$) is co-mingled with organic acid and reduced in particle size to less than 10 microns. The alumina slurry is applied to a metallic honeycomb substrate, dried and calcined at 400° to 600° C. A solution containing platinum and rhodium is impregnated onto the alumina containing monolith. The catalyst is dried, calcination is optional. This catalyst will be designated Catalyst A. Catalyst A is used in commercial application to reduce carbon monoxide and hydrocarbons in flue gas from engines combusting fossil fuels.

EXAMPLE 2

A slurry containing 85% $ZrO_2$ and 15% $SiO_2$ (surface area about 20–40 $m^2/g$) is co-mingled and reduced to a particle size of less than 10 microns. Mineral acid and/or base is added to control rheology of the slurry during application onto a metal or ceramic substrate. Following calcination at 500° C. in air, platinum and rhodium are supported onto the $ZrO_2/SiO_2$ carrier by impregnation from a solution containing platinum and rhodium. The platinum and rhodium supported on $ZrO_2/SiO_2$ was calcined at 400° C. for 1 hour. This catalyst is designated Catalyst B.

EXAMPLE 3

A commercially available Y-zeolite (surface area about 750 $m^2/g$) powder is reduced in size to less than 10 microns. The zeolite powder is co-mingled with $SiO_2$ and slurried in water. Organic or mineral acids are used to control rheology during application of the zeolite carrier to a metal or ceramic substrate. The coated substrate is dried and fired at 500° C. in air. A platinum and palladium catalyst is supported onto the Y-zeolite/-$SiO_2$ carrier by impregnation. The finished catalyst was calcined at 400° C. for 1 hour. This catalyst is designated C.

EXAMPLE 4

A slurry of titania ($TiO_2$) (surface area about 30–60 $m^2/g$) is prepared and the particle size is reduced to less than 10 $\mu m$. Mineral acid and/or base is added to control rheological properties of the slurry during application onto a metal or ceramic substrate. Following calcination at 400° C., platinum and palladium are supported onto the $TiO_2$ carrier by impregnation. The platinum and palladium was dried and fired at 400° C. This catalyst is designated Catalyst D.

EXAMPLE 5

A catalyst prepared as in Example 4, but in this example the precious metal impregnation consists of a mixture of platinum and rhodium on titania. This catalyst is designated Catalyst E.

EXAMPLE 6

A catalyst prepared as in Example 3, but in this example the precious metal impregnation consists of a mixture of platinum and rhodium on Y-zeolite. This catalyst is designated Catalyst F.

The catalysts designated Catalysts A–F prepared as described in the above examples were evaluated for oxidation activity by contacting with a simulated flue gas.

Catalyst samples of 2.75 in³ substrate volume were aged at 370° C. in a continuous-flow laboratory reactor using 60 ppm sulfur for up to 1430 hours. Catalyst samples were tested in a simulated flue gas consisting of 45 ppm CO, 30 ppm $C_3H_8$, 40 ppm NO, 10 ppm $SO_2$, 4.5% $CO_2$, 15% $O_2$, 5% $H_2O$ and the balance $N_2$. A volume of gas measured at 25° C. and one atmosphere corresponding to 110,000 volumes of catalyst per hour is flowed over the catalyst. The carbon monoxide and propane conversion are measured as the temperature of the inlet gas is increased. The CO and $C_3H_8$ removal efficiencies are presented in Table I. The data demonstrate the superior performance of sulfur-resistant catalyst carriers compared with that of a commercial high surface area alumina for oxidation catalyst operation in a $SO_x$-containing environment.

The results of these evaluations are set forth in the following Table.

TABLE I

Propane and carbon monoxide conversions for oxidation Catalysts A-F.

| Catalyst | Hours Exposure to Flue gas | Temperature °C. | Conversion % Propane | Conversion % Monoxide |
|---|---|---|---|---|
| A | fresh | 300 | 15 | 88 |
|   |       | 350 | 45 | 97 |
|   |       | 400 | 68 | 99 |
| A | 100   | 300 | 02 | 51 |
|   |       | 350 | 07 | 65 |
|   |       | 400 | 25 | 70 |
| A | 200   | 300 | 02 | 56 |
|   |       | 350 | 06 | 71 |
|   |       | 400 | 14 | 79 |
| A | 730   | 300 | 00 | 20 |
|   |       | 350 | 00 | 33 |
|   |       | 400 | 00 | 41 |
| A | 1430  | 300 | 00 | 31 |
|   |       | 350 | 00 | 45 |
|   |       | 400 | 00 | 41 |
| B | fresh | 300 | 53 | 94 |
|   |       | 400 | 84 | 99 |
|   | 100   | 300 | 57 | 95 |
|   |       | 400 | 73 | 98 |
| C | fresh | 300 | 13 | 87 |
|   |       | 400 | 42 | 94 |
|   | 100   | 300 | 25 | 98 |
|   |       | 400 | 48 | 99 |
| D | fresh | 300 | 23 | 96 |
|   |       | 350 | 48 | 98 |
|   |       | 400 | 67 | 99 |
|   | 100   | 300 | 26 | 96 |
|   |       | 350 | 50 | 98 |
|   |       | 400 | 68 | 99 |
|   | 630   | 300 | 13 | 92 |
|   |       | 350 | 43 | 95 |
|   |       | 400 | 57 | 96 |
| D | 1330  | 300 | 14 | 86 |
|   |       | 350 | 31 | 89 |
|   |       | 400 | 53 | 93 |
| E | fresh | 300 | 35 | 96 |
|   |       | 350 | 68 | 99 |
|   |       | 400 | 80 | 100 |
|   | 100   | 300 | 14 | 91 |
|   |       | 350 | 35 | 96 |
|   |       | 400 | 66 | 99 |
|   | 630   | 300 | 15 | 88 |
|   |       | 350 | 32 | 93 |
|   |       | 400 | 56 | 96 |
| E | 1330  | 300 | 06 | 78 |
|   |       | 350 | 13 | 86 |
|   |       | 400 | 40 | 90 |
| F | fresh | 300 | 25 | 90 |
|   |       | 400 | 72 | 96 |
|   | 100   | 300 | 03 | 72 |
|   |       | 400 | 25 | 89 |

The results in Table 1 show clearly that Catalyst A deteriorates with time of exposure to flue gas and has lost all hydrocarbon conversion after 730 hours and over half of carbon monoxide conversion.

Catalyst E (Pt/Rh/titania) shows the advantage of titania over Catalyst A (Pt/Rh/alumina) especially after 1330 hours exposure. Hydrocarbon conversion for Catalyst E is 40% and CO conversion is 90% at 400° C. oxidation temperature whereas Catalyst A under the same conditions having only 730 hours of operation has lost all hydrocarbon activity and over half of CO conversion activity.

Catalyst D (Pt/Pd/titania) shows advantage over Catalyst E (Pt/Rh/titania) and Catalyst A (Pt/Rh/alumina) especially after 1330 hours exposure. Catalyst D exhibits even greater performance characteristics than Catalyst E since propane conversion is 53% and CO conversion 93%. However, both Catalysts D and E are considerably more active after 1330 hours than Catalyst A after 730 hours exposure.

Comparing Catalyst B (Pt/Rh/Zr-Si) with Catalyst A (Pt/Rh/alumina), it will be observed at 100 hrs and 400° C. contact temperature that propane conversion is 73% and CO conversion is 98% for catalyst B whereas the conversions are 25% and 70%, respectively, for Catalyst A.

Catalyst F (Pt/Rh/zeolite-Si) shows better CO conversion at 400° C. after 100 hours than Catalyst A and Catalyst C (Pt/Pd/zeolite-Si) shows additional advantage of Pt/Pd over Pt/Rh of Catalyst F under the same conditions.

What is claimed is:

1. A process for the oxidative removal of CO and hydrocarbons from $SO_x$-containing waste gases which comprises contacting said waste gas in an oxidizing atmosphere at a relatively low temperature below about 500° C. in the presence of an effective amount of a sulfur-resistant catalyst consisting essentially of a ceramic or metallic monolith which has a coating consisting essentially of at least one member of the group consisting of silica, zirconia, titania and zeolite and a mixture of platinum and rhodium or platinum and palladium deposited thereon, said coating having a surface area about 20 m²/g to about 100 m²/g, the total amount of platinum and rhodium or platinum and palladium comprising about 0.005 to about 2% by weight of the catalyst composition and gas hourly space velocity of the gas contacting the catalyst being about 10,000 to about 200,000 hr$^{-1}$.

2. A process according to claim 1 wherein said contacting is effected at ranging from about 150° to about 500° C.

3. A process according to claim 1 wherein said waste gas is flue gas from engines combusting fossil fuels.

4. A process according to claim 1 wherein the coating consists essentially of titania.

5. A process according to claim 1 wherein the coating consists essentially of a mixture of zirconia and silica.

6. A process according to claim 1 wherein the coating consists essentially of silica.

* * * * *